United States Patent
Takagi

[19]

[11] Patent Number: 6,107,961
[45] Date of Patent: Aug. 22, 2000

[54] MAP DISPLAY SYSTEM

[75] Inventor: Satoru Takagi, Tokyo, Japan

[73] Assignee: Kokusai Denshin Denwa Co., Ltd., Tokyo, Japan

[21] Appl. No.: 09/028,484

[22] Filed: Feb. 24, 1998

[30] Foreign Application Priority Data

Feb. 25, 1997 [JP] Japan .................................. 9-055454

[51] Int. Cl.⁷ .................................................. G01S 7/185
[52] U.S. Cl. .................. 342/357.13; 701/208; 340/990; 340/995
[58] Field of Search ...................... 342/357.13; 701/208, 701/212; 340/990, 995

[56] References Cited

U.S. PATENT DOCUMENTS 5,758,313  5/1998  Shah et al. .............................. 701/208
5,922,040  7/1999  Prabhakaran ............................ 701/117

*Primary Examiner*—Theodore M. Blum
*Attorney, Agent, or Firm*—Arent Fox Kintner Plotkin & Kahn PLLC

[57] ABSTRACT

A map display system includes a plurality of geographic information servers, a geographic information search server and clients, connected to each other through network. The geographic information search server searches a plurality of geographic information servers and generates a combination list containing information of existential place of the plurality of geographic information servers. The clients obtain a plurality of geographic information from the plurality of geographic information servers designated by the combination list and display the obtained plurality of geographic information while superimposing them so that the coordinates thereof coincide each other on the same screen.

10 Claims, 7 Drawing Sheets

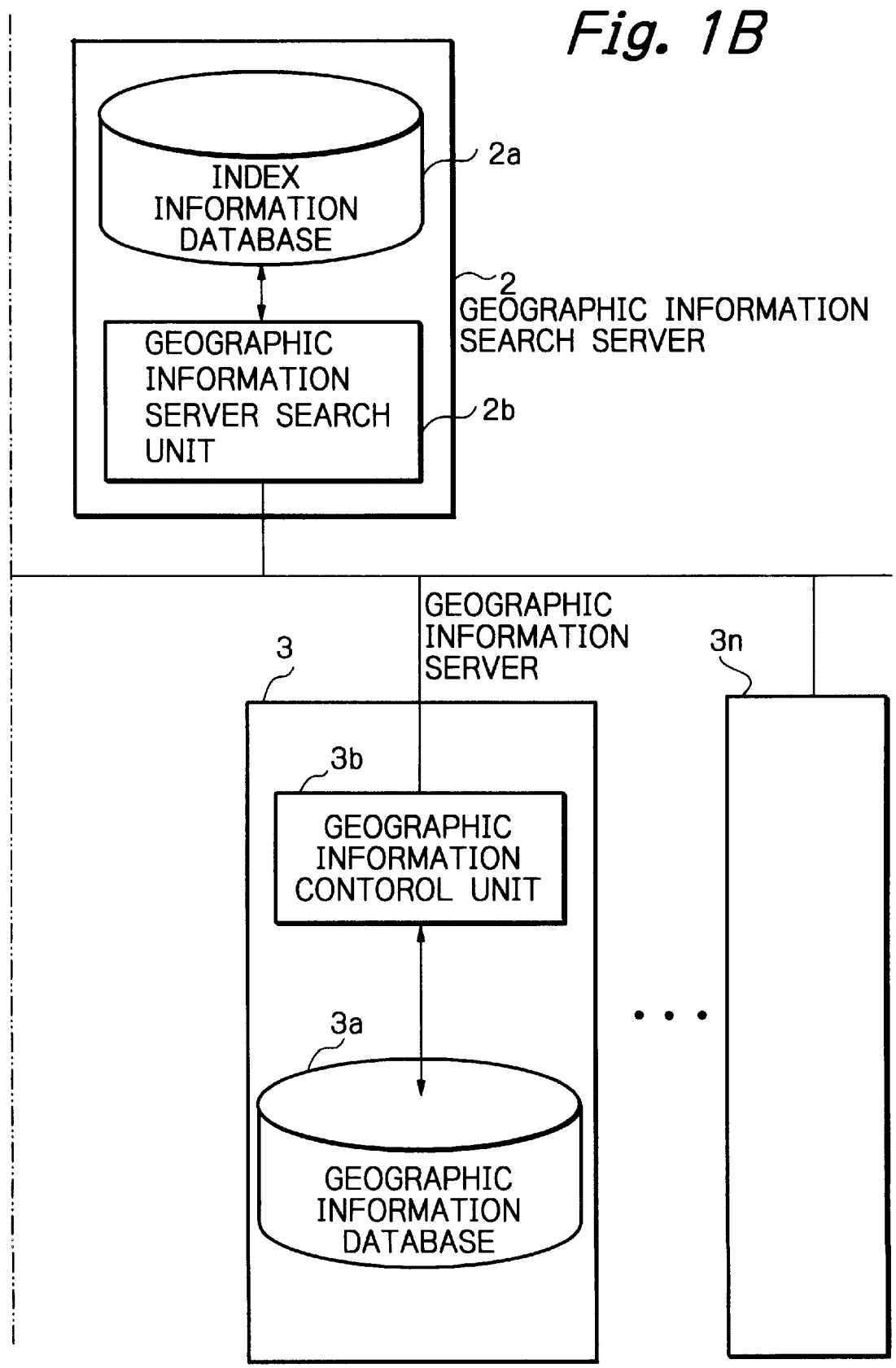

Fig. 2A

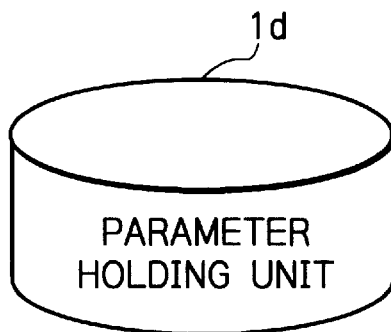

| Fig. 2 | | |
|---|---|---|
| Fig. 2A | Fig. 2B | Fig. 2C |

CLIENT 1

1d PARAMETER HOLDING UNIT

1b USER INTERFACE CONTOL UNIT

S8 START UP GEOGRAPHIC INFORMATION SERVER ACCESS UNIT FOR ACCESSING TO A PLURALITY OF INFORMATION SERVER OF COMBINATION LIST

S12 GENERATE USER INTERFACE FROM INFORMATION OF INHERENT FUNCTIONS

S13 SEND PARAMETER OF INDEX INFORMATION

S14 UPDATE COMBINATION LIST AND STORE IT PARAMETER HOLDING UNIT

S19 WAITING OF OPERATOR'S COMMAD

S20 CHANGE IMAGE AREA (ENLARGEMENT, REDUCTION, SCROLL)

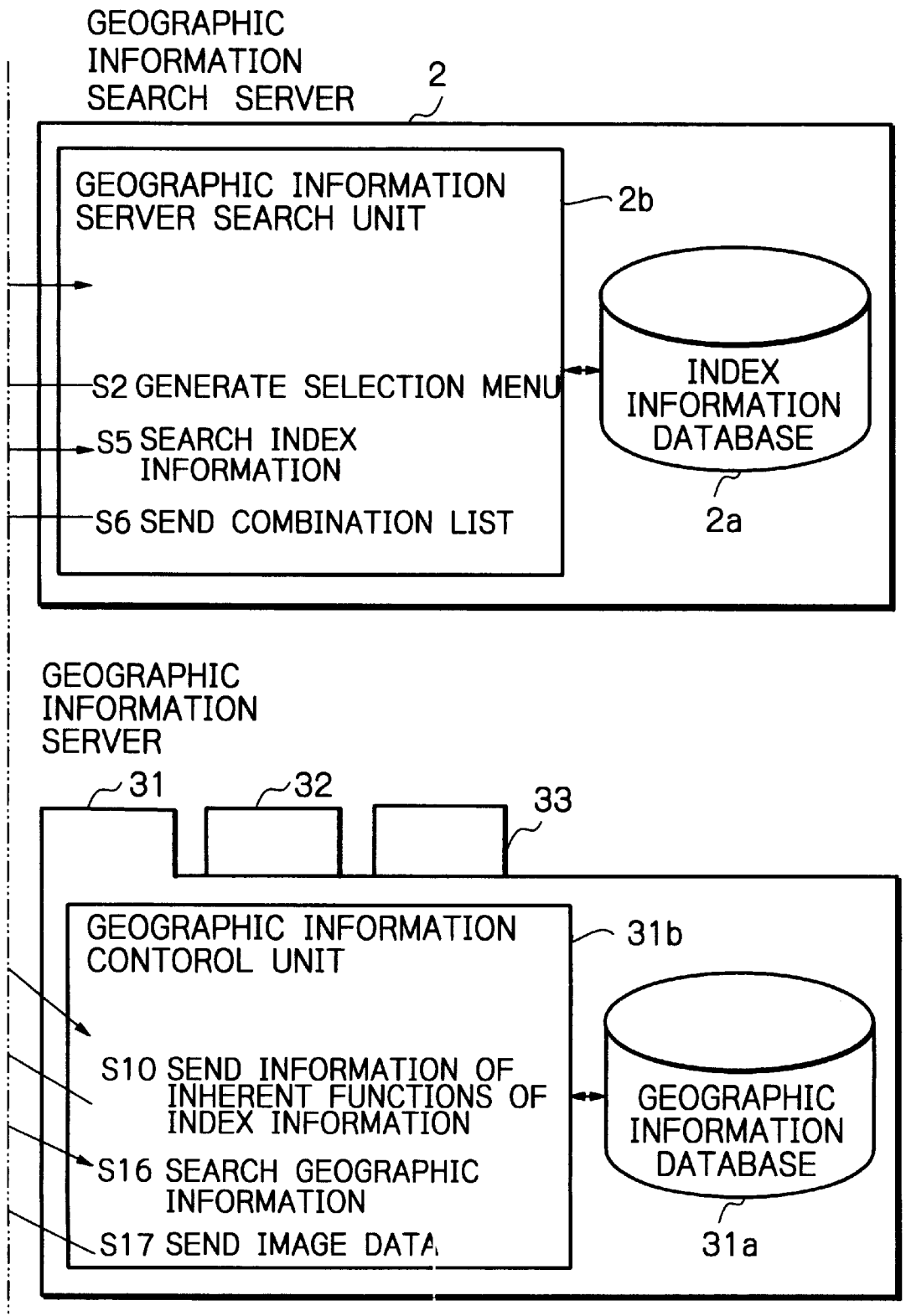

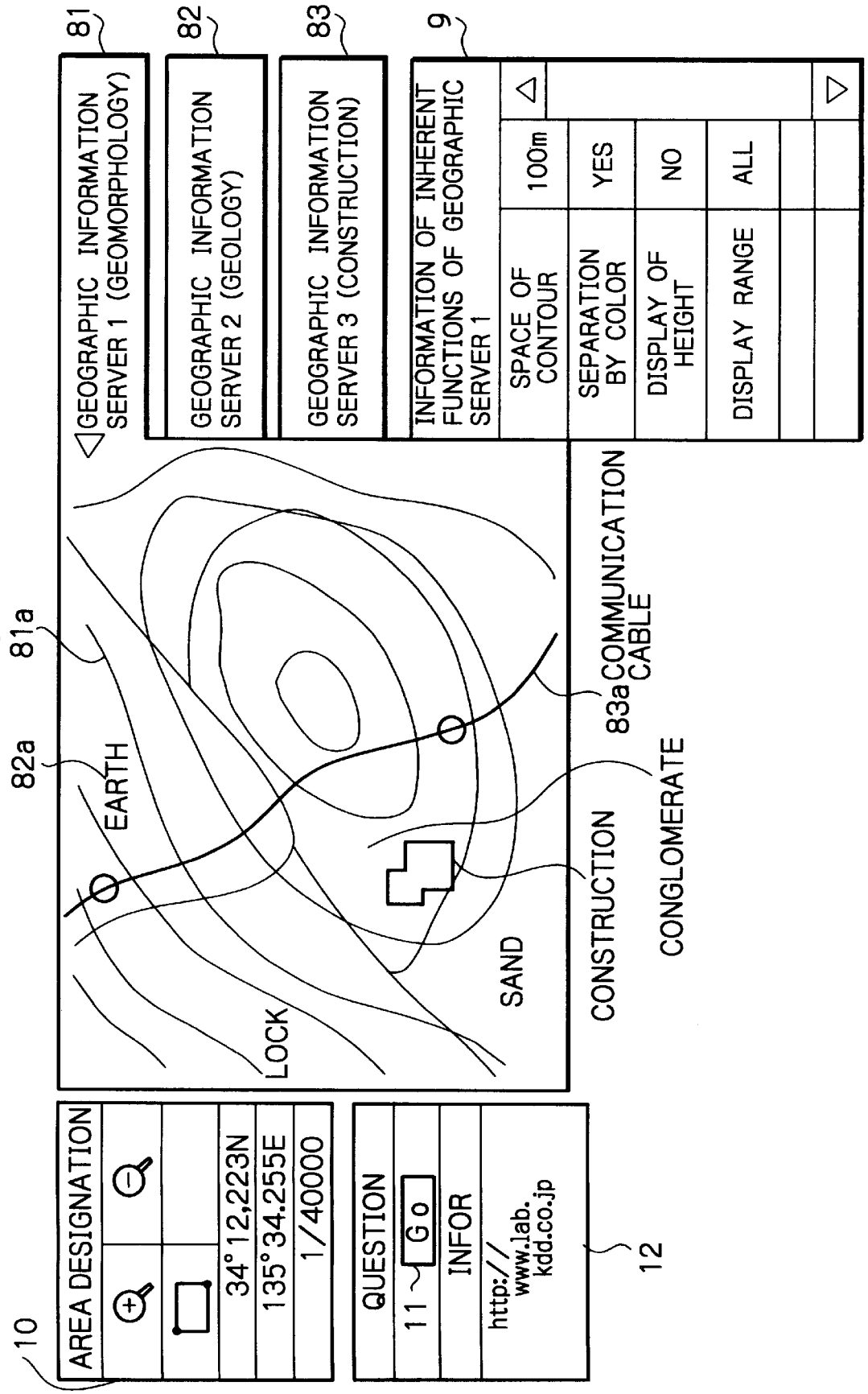

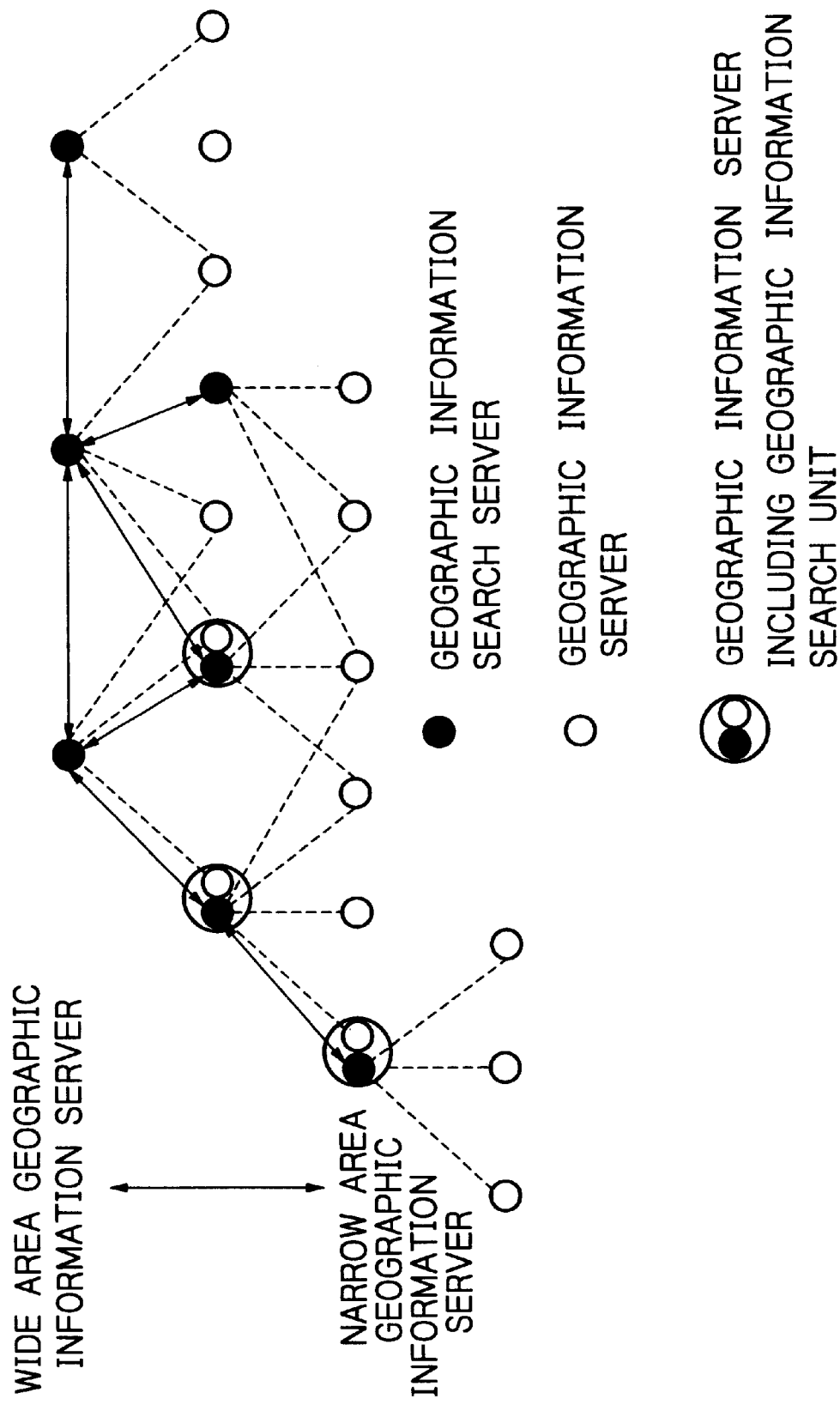

MAP DISPLAY SYSTEM

FIELD OF THE INVENTION

The present invention relates to a map display system which can display geographic information in computers on a wide area network to a client.

DESCRIPTION OF THE RELATED ART

In a conventional map display geographic information system, many systems are used as stand-alone configurations, for example, such as a car navigation system.

In the car navigation system, a single storage medium contains recorded position information such as roads and shopping areas and the like while a map range, which corresponds to a region which can be displayed, is previously limited. In the displayed map, an operator can select display information.

Further, there is a system in which a single geographic information server is connected to internet, thus the geographic information is provided to an unspecified number of clients.

However, the conventional geographic information is provided from one medium or a server at one place. Particularly, various kinds of geographic information servers existing on the internet are not linked to each other as a geographic information system, but they are isolated respectively.

Thus, when a client searches one geographic information server, a client must again connect to another geographic information server for searching geographic information of an area portion provided by the server. For example, if a client intends to search the town level road information during the searching of a geographic information server which was specialized in country level road information, a client must change the connection from the first server to connection to another geographic information server which is specialized in the town level road information. Furthermore, if a client intends to search position information of shopping areas, one must change the connection to the server to connection to another geographic information server which is specialized in that particular information.

In order to overcome such disadvantages, it is considered that one geographic information server is linked to a plurality of geographic information servers to provide one integrated geographic information to a client.

However, it is not technically possible to link geographic information at the data level if the link between geographic information servers is not based on the same specification. Therefore it is very difficult to link between geographic information servers based on the existing different specifications.

SUMMARY OF THE INVENTION

Therefore, an object of the present invention is to provide a map display system in which a client can display various geographic information with a plurality of geographic information servers on the network.

The present invention provides a map display system including a plurality of geographic information servers, a geographic information search server searching the geographic information servers and clients displaying a map, connected to each other through a network, and displaying geographic information in the geographic information servers by the clients. The geographic information search server includes an index information database containing index information of geographic information provided by each geographic information server, and a geographic information server search unit searching a plurality of geographic information servers and generating a combination list containing location information of the plurality of geographic information servers. The clients include a geographic information search server access unit for obtaining the combination list, a geographic information server access unit for obtaining a plurality of geographic information from the plurality of geographic information servers designated by the combination list and an user interface control unit for displaying the obtained plurality of geographic information while superimposing them so that the coordinates thereof coincide with each other on the same screen. Thus, the client in map display system can display geographic information in all of the geographic information server on network.

According to an embodiment of the invention, the index information include information of an image range common to all of the geographic information servers and information of specific functions of each of the geographic information servers.

According to an embodiment of the invention, the information of image range of the index information includes items of a name of district of the geographic information, display range, display contents and maximum and minimum scales.

Thus, the client can clearly know the geographic information possible provided by each geographic information server.

According to an embodiment of the invention, the combination list further comprises a parameter for the information of image range and a parameter for the information of specific functions. Thus, the geographic information server can generate image data in accordance with parameters in the index information.

According to an embodiment of the invention, the geographic information servers includes a geographic information database containing the geographic information and a geographic information control unit for searching the geographic information by using the geographic information database, and the geographic information control unit converts the geographic information into image data of a standard graphics data format and sends the image data to the clients. Thus, a client can easily display a plurality of image data at an image level while superimposing the data. Further, even if the geographic information is image data in the raster image data format, a client can the geographic information as image data in background or utilize it while superimposing an image having transparent attributes.

Since the image data is in a standard graphics data format and the client executes only an image operation, the client's software can easily access the data and render the image. And since the logical structure data possessed by the serves not stolen taken from the network, the security is high.

The number of coordinate systems for indicating a position of an object may be one. Thus, the client can easily superimpose the maps provided by different servers.

The client may convert image data with one coordinate system to image data with another coordinate. Thus, if the coordinate is not unified, the client can superimpose the maps. In addition, the parameter of combination list may include converting parameters for converting image data.

According to an embodiment of the invention, the geographic information control unit generates the image data in accordance with a parameter based on the index information commanded by the clients. Thus, the client need not generate and process the image data.

According to an embodiment of the invention, the geographic information control unit previously sends information of inherent functions in the index information possible provided the unit itself to the clients. In a user interface control unit, a user interface which can be selected by an operator for items of specific functions of index information can be generated. Thus, a parameter of a combination list previously received from a geographic information search server can be changed on a client side and the client can directly command the parameter to a geographic information server.

According to an embodiment of the invention, the clients further comprise a parameter holding unit storing parameters based on the index information. Thus, since the client can cut the connection to the geographic information server at the time when reception of image data has been completed, the geographic information server does not need to have a parameter holding region to the access from a unspecified number of clients. It is desirable that image data sent by the geographic information server furthermore has link information to other servers. Thus, the same functions as that of hyperlink in WWW and of a clickable map can be implemented.

According to an embodiment of the invention, the geographic information search server access unit in the client accesses the geographic information search servers in order that the clients obtain the combination list again when a map outside the range of the index information is demanded. When a client demands to search geographic information no provided by the geographic information server, the server can notice the fact that the demanded area is outside the possible display area to the client.

According to an embodiment of the invention, the geographic information servers further include the index information database and the geographic information server search unit. The geographic information server search unit is constituted so that when a map outside the range of the index information is demanded, the server search unit searches the corresponding other geographic information servers by using the index information database, generates the combination list, and sends the list to the clients. Thus, the client can display the display condition in common with all of geographic information servers. Further, since specific functions of the geographic information servers are also used with an integrated user interface unit, a seamless operational environment for search and display can be provided.

According to an embodiment of the invention, the geographic information server further includes the geographic information server access unit and obtains geographic information from a designated other geographic information servers by using the geographic information server access unit in accordance with the combination list. The geographic information server including the geographic information server access unit can send the combination list including items provided by only the other geographic information server although it have no contents of image data. Further, by this function, the servers can be hierarchically formed, whereby a more efficient group of geographic servers can be provided.

BRIEF DESCRIPTION OF THE DRAWINGS

FIGS. 1A and 1B show a block diagram of the map display system according to a preferred embodiment of the present invention;

FIGS. 2A–2C show a sequence diagram of FIG. 1;

FIG. 3 shows an image display displayed by a client in FIG. 1; and

FIG. 4 shows a hierarchical tree structure of the geographic information servers and geographic information search servers in FIG. 1.

DESCRIPTION OF THE PREFERRED EMBODIMENTS

Preferred one embodiment of the present invention will now be described with reference to the drawings.

Figure 1A:
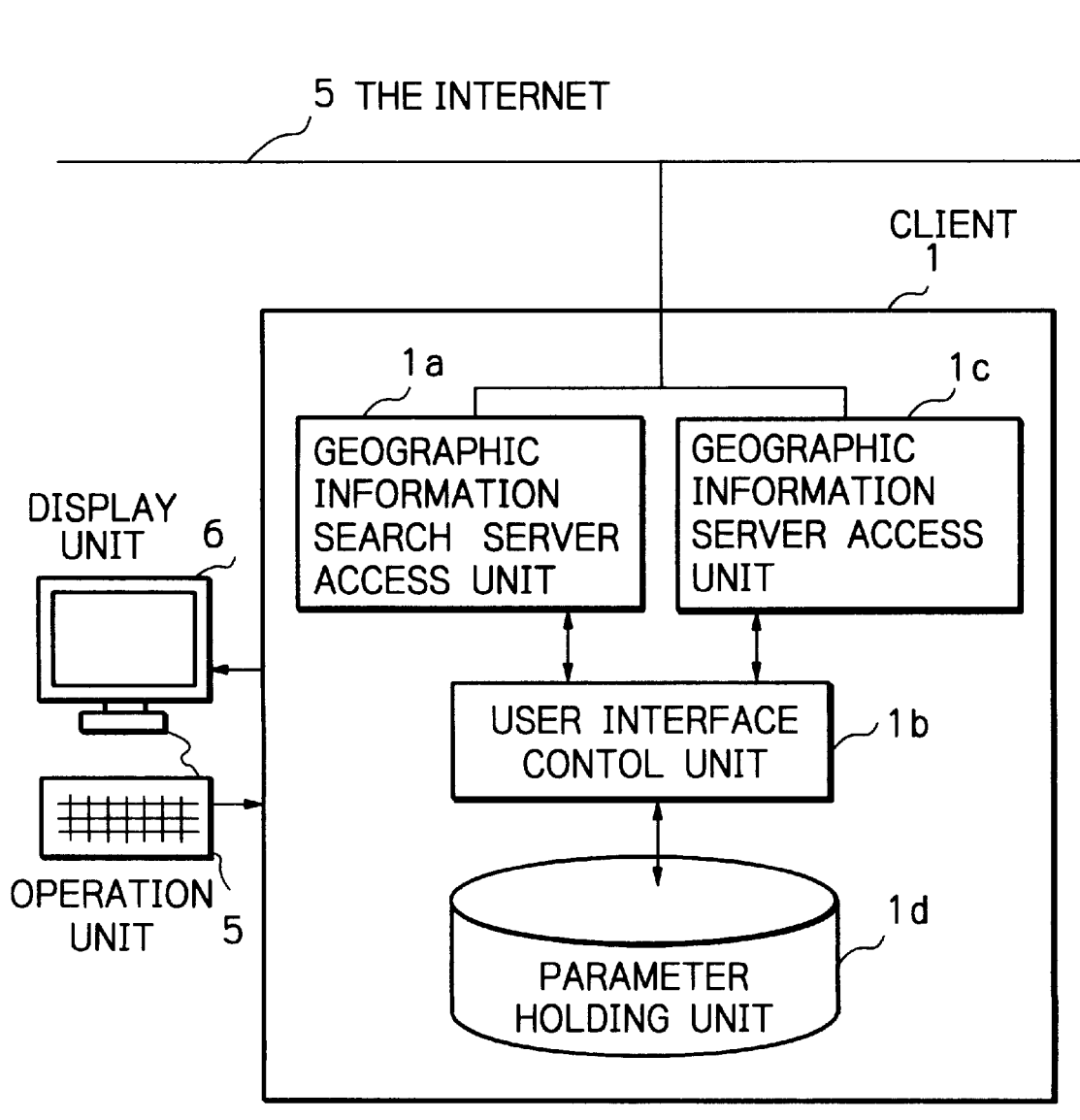

As shown in FIG. 1, in the map display system, a plurality of geographic information servers 3, a geographic information search server, 2 searching the geographic information server and a client 1 displaying a map are connected to each other through a network such as internet 5.

The geographic information server 3 includes a geographic information database 3a storing geographic information and a geographic information control unit 3b converting the geographic information to image data and sending the information to a client 1.

The geographic information control unit 3b effects functions of the searching of a geographic information from the geographic information database 3a, the generation of a geographic information in accordance with the parameters of index information, the conversion of the geographic information to image data and the transmission of the image data to clients.

The image data is embodied as a standard graphics data format such as POST SCRIPT (Trademark of Adobe System Inc.). In order to utilize the existing geographic information system with different specifications, the geographic information control unit 3b converts geographic information to the image data, thereby absorbing differences of the specifications of the geographic information. This function of conversion can be provided as a middleware, thereby can be relatively easily mounted on many existing geographic information systems.

The coordinate system for indicating image position of image object employs a coordinate system unifying an origin position and a scale. For example, the coordinate system could be the positioning system WGS-84 used in GPS (Global Positioning System).

If the coordinate system is not unified, the client can superimpose the maps by converting image data with one coordinate system to image data with another coordinate.

Further, the display of an image is performed on an appropriate scale in accordance with scaling up or scaling down based on the parameter of the display range of the index information. For example, in a scaled-up map, even narrow roads can be displayed, while in a scaled-down map, only main roads can be displayed.

The index information includes common items in the whole geographic information servers, and items of specific functions in each geographic information server. The common items include the names of areas or districts, the range of display, the contents of display and the maximum or minimum scale. Parameters can be designated with respect to the respective items.

Further, when a geographic information server is accessed from a client, it sends items of specific functions of index information possible provided by server itself. Thus, the client can display selectable user interfaces for an operator.

Therefore, the operator can understand the range of geographic information possible provided by the geographic information server, and can directly command the change of parameters.

The geographic information server 3 is concretely implemented by adding functions to the WWW server. The communication protocol between the geographic information server 3 and the client 1 is implemented in a form based on the HTTP (Hyper Text Transfer Protocol).

The geographic information search server 2 includes an index information database 2a including index information and a geographic information server search unit 2b generating a combination list of a plurality of geographic information servers.

The index information database 2a stores index information possible provided by geographic information server itself every geographic information server.

The geographic information server search unit 2b determines combination of a plurality of geographic information servers most suitable for the search condition by clients, parameters based on items of specific functions of the geographic information servers in index information and parameters based on common items of the whole geographic information servers in index information.

The geographic information search server 2 sends the combination list of these determined information to clients.

A form of a combination list will be described below.

```
MRL {
        URL of a geographic information server 1
        + parameter of information of inherent
            functions of the server 1;
        URL of a geographic information server 2
        + parameter of information of inherent
            functions of the server 2;
        URL of a geographic information server 3
        + parameter of information of inherent
            functions of the server 3;
} parameter of the information of image range;
```

The above-mentioned URL (Uniform Resource Locator) designates address of geographic information of geographic information servers. Further, the parameters are information of specific functions of index information possible displayed by the geographic information server.

The combination of a plurality of geographic information servers, which is most optimal to display, is called as MRL (Multiple Resource Locator).

Additionally, the MRL are included parameters of information of image range which are common to geographic information servers.

In an embodiment, the geographic information search server 2 is expansion of functions of the server of WWW.

The client 1 has a geographic information search server access unit 1a, a geographic information server access unit 1c, a user interface control unit 1b and parameter holding unit 1d.

The geographic information search server access unit 1a is a unit for obtaining a combination list. The geographic information search server access unit 1a sends the search condition to the geographic information search server 2 and receives a combination list of the geographic information server 3 from the geographic information search server 2. After that, the geographic information search server access unit 1a sends the combination list to the user interface control unit 1b. The geographic information search server access unit 1a can be relatively easily implemented by a WWW browser.

The geographic information server access unit 1c obtains a plurality of geographic information from a plurality of a geographic information server and displays the obtained geographic information on a display unit 6 while superimposing the information with the coordinates coincided with each other. Each of geographic information server access unit 1c corresponds to each of geographic information servers 3n respectively. Also, the geographic information server access unit 1c obtains URL sent from the user interface control unit 1b and sends a parameter of index information to the corresponding geographic information server 3. Thus, geographic information server access unit 1c receives information of specific functions of index information and image data based on the post script format from the geographic information server 3n, and sends these information to the user interface control unit 1b and the display unit 6.

The user interface control unit 1b is a unit for controlling the geographic information server access unit 1c in accordance with command from an operator and information from the geographic information search server access unit 1a. The user interface control unit 1b separates the combination list received from the geographic information search server access unit 1a into URL of every geographic information server 3n. Then, the user interface control unit 1b sends the parameters of information of inherent functions of the respective geographic information servers and the parameters of information within a range of image common to the whole geographic information servers 3n, to the respective geographic information server access unit 1c. Further, the user interface control unit 1b provides an operator with user interface of functions of servers, such as a text input column or button, in accordance with items of specific information of index information. That is, the user interface control unit 1b performs display of a selector button, generation of selection, generation of a text input area, generation of a coordinate input requiring item and transmission of the fact that the above-mentioned factors have been operated by an operator to servers. For example, the user interface control unit 1b effects the same functions as the browser in WWW. All of the actual processing is carried out on a geographic information server's side.

The parameter holding unit 1d stores a display state or the like of a client. The parameter holding unit id stores a combination list and information of specific functions of each geographic information server. The existing parameter state with respect to information of specific functions of index information is updated in parameter of information of specific functions of the combination list. Further, the existing parameter state with respect to information of existing image range is also updated in parameter of information of image range of the combination list. As a result, since the connection to the geographic information server 3 can be cut at the time when reception of image data has been completed, the geographic information server 3 does not need to have a parameter saving area with respect to access from an unspecified number of clients.

Figure 2B:
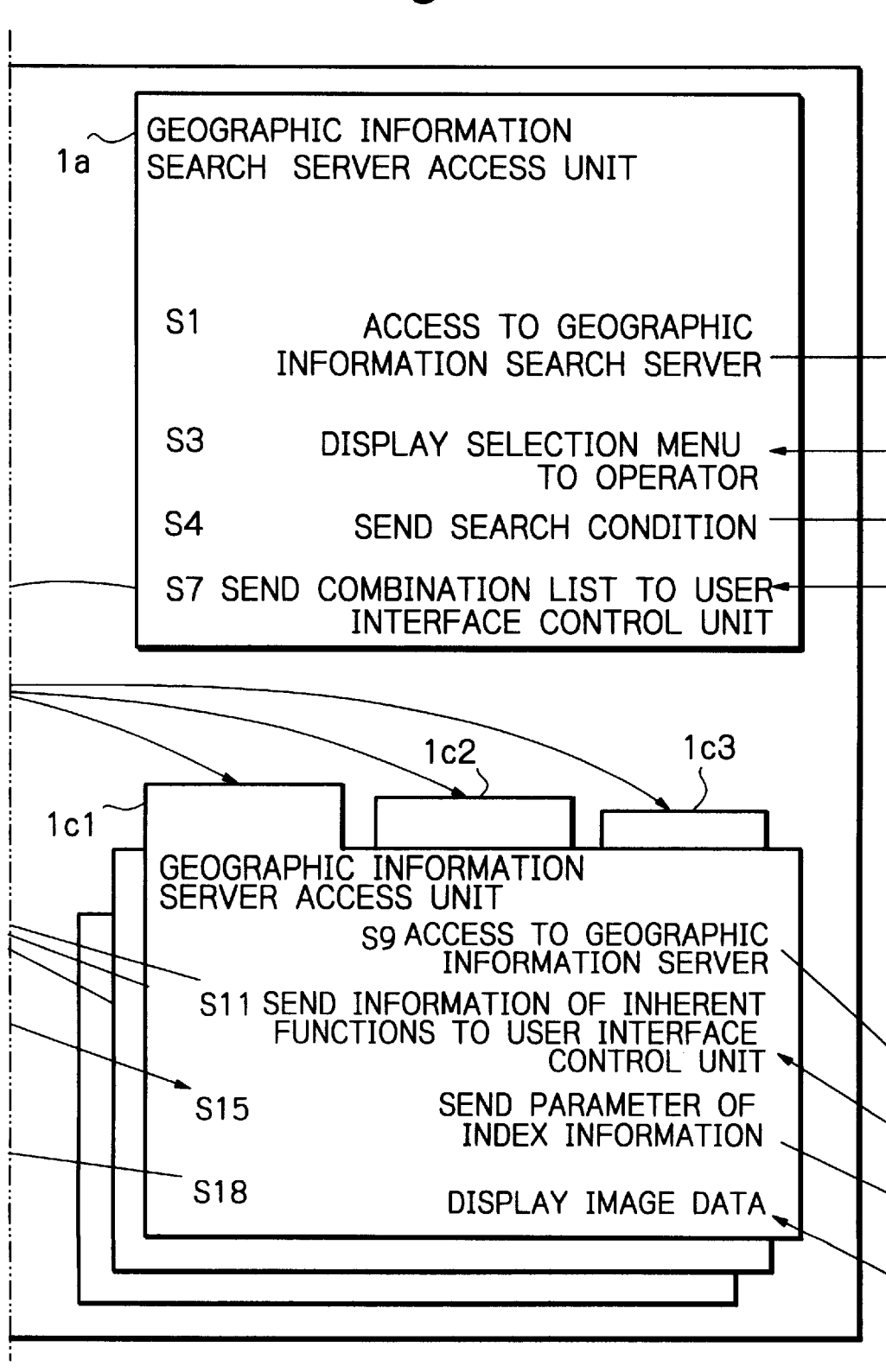

FIG. 2 is a sequence diagram of FIG. 1.

First, the sequence between a geographic information search server access unit 1a of the client 1 and a geographic information search server 2 will be described.

When a demand for a map display is generated in client 1, the geographic information search server access unit 1a has access to the geographic information search server 2 (S1).

The geographic Information server search unit 2b of the accessed geographic information server 2 generates a selection menu and sends it to a client 1 (S2).

The geographic information search server access unit 1a of the client 1 displays the received selection menu to an operator (S3). After that, the geographic information search server access unit 1a waits for a command from the operator and sends a search condition based on the command to the geographic information search server 2 (S4).

The geographic information server search unit 2b which received the search condition searches using the index information database 2a (S5). As a result of the search, a combination list which stored a plurality of geographic information server which is suited for the condition and the parameter with respective to the index information is sent to the client 1 (S6).

The geographic information search server access unit 1a which received the combination list sends the combination list to the user interface control unit 1b (S7).

Next, sequence between of the user interface control unit 1b of the client 1 and the geographic information server access unit 1c, and the geographic information server 3 will be described.

In order to have simultaneous access to a plurality of geographic information servers 31, 32 and 33 of the combination list, the user interface control unit 1b generates a plurality of geographic information server access units 1c1, 1c2 and 1c3 and starts up (S8). This procedure is the same procedure as the parent process generating a plurality of the child processes.

The generated geographic information server access unit 1c accesses to the corresponding geographic information server 3 (S9). The geographic information server access unit 1c1 corresponds to the geographic information server 31, the geographic information server access unit 1c2 corresponds to the geographic information server 32, and the geographic information server access unit 1c3 corresponds to the geographic information server 33, respectively. In this case, as an example, the sequence of the geographic information server 31 will now be described. Both the geographic information servers 32 and 33 also have the same constitution and sequence.

A geographic information control unit 31b of the accessed geographic information server 31 sends information of specific functions of index information possible previously provided by the control unit itself (S10).

The geographic information server access unit 1c1 of the client 1 received sends the information of specific functions from the geographic information server 31 (S11). The information of specific functions of index information may be previously received from the geographic information search server 2. Further, the combination list received from the geographic information search server 2 includes only URL of a plurality of geographic information servers and information of common image range and can also receive the information of specific functions in S11.

The user interface control unit 1b generates a user interface for controlling a map image, such as a text field and a button, in accordance with a plurality of received information of inherent functions (S12). Further, the user interface control unit 1b displays only one setting button for information of image range common to the all of the geographic information servers in index information.

Then, the user interface control unit 1b separates the combination list every geographic information search server. And, the control unit 1b sends the parameters of index information to the respectively corresponding geographic information server access unit (S13).

In the first display the user interface control unit 1b sends the parameter to all of the geographic information server access unit 1c. However, after that, the control unit 1b sends the parameter to only a geographic information server in which parameter was changed. Consequently, the transmission of image data from the geographic information server which does not need to image can be omitted.

Then, a parameter state of index information to be displayed is stored in the parameter holding unit 1d every combination list (S14).

The geographic information server access unit 1c1 receiving parameter of index information sends the parameter of the index information to a corresponding geographic information server 31 (S15).

A geographic information control unit 31b of the geographic information server 31 which received the parameter of index information searches geographic information from a geographic information database 31a in accordance with the parameter (S16). The searched geographic information generates geographic information in accordance with the parameter. After that, the geographic information control unit 31b converts the geographic information to image data and sends the image data to a client (S17).

The geographic information server access unit 101 which received image data displays the image data superimposed on the same coordinate on the same window of a display unit 6 together with other server access unit (S18). The geographic information server access unit 1c1 has the map forming process (cartography) for displaying image data of a graphics data format.

Then the client 1 waits for a command from an operator (S19). After that, when change of image range (enlargement, reduction and scroll and the like) is commanded, a parameter of the information of the corresponding image range is changed (S20). Then the operations from S13 to S20 are repeated.

When the command of the operator exceeds the range of information of the image range, the user interface control unit 1b can again obtain the combination list of the plurality of geographic information server 3 through the geographic information search access unit 1a.

FIG. 3 shows an image display displayed by a user interface control unit 1b and a geographic information server access unit 1c. In this display, all information of a geographic information server with geomorphologic information, a geographic information server with geologic information and a geographic information server with construction information is displayed while being superimposed on the same coordinates. The geographic information server of the geomorphologic information provides image data of contour lines (geomorphology) 81a, the geographic information server of the geologic information provides image data of sand (geology) 82a, and the geographic information server of construction information provides image data of communication cables (construction) 83a, respectively.

Tabs 81, 82 and 83 corresponding to the respective geographic information servers are displayed in FIG. 3. When any one of these tabs is selected, the item 9 for information of an inherent function of the selected geographic information server is displayed and the parameter in the item 9 can be changed.

Further, in the area designating user interface 10, the parameter of information of image range common to all servers can be displayed and changed.

Further, there is displayed a clickable pointer 10, and enlargement and reduction of map can be easily performed by operating an operating unit 7 such as a mouse or the like.

GO button 11 can access to the geographic information search server 2 by operator's command.

Further, URL information 12 displays URL of the geographic information server included in information of image data pointed to a map by using a mouse pointer. The geographic information of the geographic information server can be displayed by using GO button 11. Thus, the function generally designated as a clickable map in WWW can be implemented.

Graphics to be imaged can have linkage to data of other servers which correspond to hyperlink in WWW, as a clickable map. Further, the index information stored in the geographic information search servers can be treated as one kind of geographic information since it includes the location information of the geographic information server and information of image range such as display area, display contents and the like.

Accordingly, another embodiment of the present invention, in which functions of a geographic information search server are included in a geographic information server, and an operation environment which is seamless between search and display is provided, will be described in detail below.

The geographic information server including geographic information server search unit is one that includes an index information database and geographic information server search unit and a geographic information server access unit. Even though a range outside the index information possible provided by the geographic information server is desired, the geographic information server search unit searches the corresponding other geographic information servers using an index information database, obtains geographic information from the searched other geographic information servers using a geographic information server access unit and sends the obtained geographic information to a client by the geographic information control unit.

The geographic information server used as such geographic information search server will be able to add the MRL to linkage information added to each object of image data.

Further, by forming the whole image data as one large graphics object, the MRL can be added to the object as linkage information.

The structure of image data will be showed below.

```
[Image data]:MRL{
  [Road]:MRL{
    [Road1]:MRL{URL1+Info1,URL2+Info2,URL3+Info3}
    [Road2]:MRL{URL1+Info1,URL2+Info2,URL3+Info3}
  }
  [Construction]:MRL{
    [Construction1]:MRL{URL1+Info1,URL2+Info2,
                        URL3+Info3}
    [Construction2]:MRL{URL1+Info1,URL2+Info2,
                        URL3+Info3}
  }
} information of image range;
```

In the geographic information server including geographic information server search unit, image data with the above-mentioned structure can be sent to a client as a result of search of the geographic information server. In this case, the range of index information of a geographic information server may be imaged as a border line and selected. Thus, the MRL corresponding to the selected part can be accessed. Usually, one of search conditions in the range which is displayed for clients is searched. However, in the case of searching with a wider region including the above range, the MRL of the result of search may be within the object of the whole image data to be sent.

It is preferred that since an operator involuntarily uses browsing of the search and map, the next function is expanded.

When an operator demands information of an area which cannot be imaged to a geographic information server which had already been accessed, the geographic information server automatically obtain the search result from a geographic information server search unit used and can have access to a new server group again in accordance with the search result. Consequently, if an operator once sets a search condition, the operator can automatically have access to appropriate geographic information without the intention of performing any search when the display area is transferred and its enlargement and reduction are performed.

FIG. 4 shows a hierarchical tree structure of the geographic information servers and geographic information search servers. A geographic information search server also can search other geographic information search server. And these geographic information search servers can be linked to each other. Thus, it is not necessary for one geographic information search server to have index information of all of geographic information servers. For example, the geographic information search server can constitute geographic information servers from a geographic information server with a wide area geographic information to a geographic information server with narrow area geographic information. That is, when the display area is enlarged, a server with further detailed data can be searched in accordance with the specific place and desired scale.

As described above, since the present invention has geographic information search servers which generate a combination list of a plurality of geographic information servers and displays geographic information obtained from the plurality of geographic information servers while superimposing the information, various geographic information which cannot be provided by one geographic information server can be provided from a plurality of geographic information servers on the network.

Further, in the present invention, since the geographic information server converts geographic information to image data of a standard graphics data format and sends the data, a client can easily display a plurality of image data at the image level while superimposing it.

Further, the function of conversion can be relatively easily provided as a middleware of an existing geographic information server, and a plurality of geographic information server groups with different specifications from each other can be used as geographic information servers with the same specifications.

Additionally, since the geographic information server also includes the geographic information server search unit, the geographic information server group can be hierarchically formed, whereby a more user friendly internet application can be provided.

Many widely different embodiments of the present invention may be constructed without departing from the spirit and scope of the present invention. It should be understood that the present invention is not limited to the specific embodiments described in the specification, except as defined in the appended claims.

What is claimed is:

1. A map display system including a plurality of geographical servers, a search server and a client;

a geographical server of said plurality of geographical servers includes a first database for storing geographical information, and a first control means for searching the geographical information by using the first database, converting the searched geographical information into graphics data with a standard format and with same coordinates and sending the converted graphics data to the client, said search server including a second database for storing index information of the graphics data provided from each of the plurality of geographical servers, and a second control means for generating a combination list which contains location information with respect to locations of the geographical servers and sending the combination list to the client, and said client including a search server access means for obtaining the combination list, a geographical server access means for obtaining the graphics data from the geographical servers designated by the obtained combination list, and a display means for displaying a map on a screen so that the obtained graphics data are superimposed with each other on the same screen.

2. A map display system according to claim 1, wherein the index information include region parameters for defining a region within which the graphics data are to be displayed and function parameters for specific functions provided from each of the geographical servers.

3. A map display system according to claim 2, wherein the region parameters includes items of a region name, a display region, a contents of display and maximum/minimum scales, of the geographical information.

4. A map display system according to claim 2, wherein the combination list further includes the index information of the graphics data provided from the geographical servers designated by the location information.

5. A map display system according to claim 1, wherein the first control means generates the graphics data based upon parameters commanded by the client.

6. A map display system according to claim 1, wherein the first control means sends available parameters to the client before the client access to the geographical server by the geographical server access means.

7. A map display system according to claim 1, wherein the client further including store means for storing the index information.

8. A map display system according to claim 1, wherein the search server access means accesses to the search server in order to obtain the combination list again when a map outside the region of the index information is commanded.

9. A map display system according to claim 1, wherein the geographical server further includes the second database and the second control means.

10. A map display system according to claim 9, wherein the geographical server further includes the geographical server access means.

* * * * *